United States Patent Office 3,552,781
Patented Jan. 5, 1971

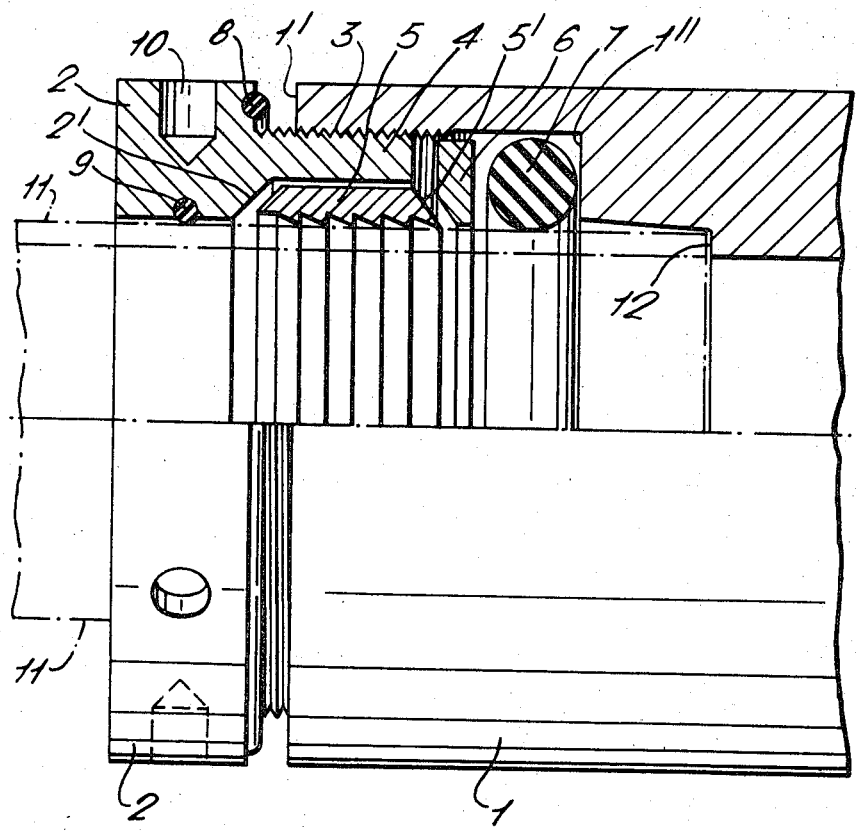

3,552,781
PIPE OR HOSE COUPLING
Arvid Frimann Helland, Snaroya, Norway, assignor to Raufoss Ammunisjonsfabrikker
Filed May 26, 1969, Ser. No. 827,617
Claims priority, application Norway, May 28, 1968, 2,084/68
Int. Cl. F16l 21/06
U.S. Cl. 285—322            5 Claims

ABSTRACT OF THE DISCLOSURE

A fluid coupling for the end of a pipe or hose. A nipple mounted on the end of the pipe or hose forms an open-ended annular space, within which is located a sealing gasket and a clamping sleeve. A tightening nut, when threadedly engaged into the annular space, acts directly (a) on the clamping sleeve causing it to grip the hose or pipe and (b) on the gasket, bypassing the clamping sleeve, to compress the gasket.

---

The present invention relates to an arrangement in or relating to a pipe or hose coupling of the type that can me water-tightly secured to an end portion of a pipe or hose by the aid of a clamping device and a packing means, the coupling comprising a nut to be tightened on a threaded nipple. Between the nut and the nipple a clamping sleeve is arranged and with a beveled end face interacts with a corresponding beveled face on the nut; also a thrust ring is placed between the clamping sleeve end remote from the nut and a gasket, which gasket with its side remote from the thrust ring is resting against a shoulder or the like on the nipple.

The invention is an improvement of the pipe or hose coupling specified in the applicant's Norwegian patent specification No. 103,389. The coupling specified in said patent specification is suitable for smaller pipe or hose dimensions. For larger dimensions it has proved to be less advantageous. The object of the invention is to provide a modified pipe or hose coupling being suited for large pipe or hose dimensions and showing considerable moulding technical advantages as well as facilitating the subsequent machining. Thus, couplings according to the invention are not only technically more advantageous than the couplings previously proposed by the inventor, but they also provide for a more rapid simplified and less costly production.

According to the invention a pipe or hose coupling of said type is suggested which is characterised in that the nut is provided with a tubular extension externally threaded for interaction with internal threads on the nipple and which inside between the coupling and the pipe or hose surface leaves space for the clamping sleeve, these elements being so adapted that, as the nut is tightened, the beveled nut face will be forced against the clamping sleeve and the extension end of the nut will be forced against the thrust ring.

According to a preferred embodiment packing means, preferably in the form of O rings are arranged between the nut and the nipple and between the nut and the pipe or hose surface. The above mentioned means of the coupling are thus locked out water-tightly from the pipe or hose surroundings. Water or other fluids thus cannot penetrate to these means to cause corrosion which sooner or later would damage the effective connection between said means.

The invention will further be described hereinafter with reference to an embodiment shown in the drawing. The figure shows a side elevation and in part a section of a pipe or hose coupling according to the invention.

1 is the coupling nipple interacting with a nut 2, the nipple being provided with an internal threaded sleeve portion engaging external threads on a tubular extension 4 on the nut 2. It is this extension and the arrangement of said extension in connection with the adjacent means which constitute the essential feature of the invention.

A clamping sleeve 5 which internally is preferably provided with sharp slots for engagement with the pipe or hose 11 surface is placed inside the tubular extension 4. The nut 2 has a beveled face 2' for interaction with a corresponding beveled face on the clamping sleeve 5. Inside the end of the extension 4 a thrust ring 6 is arranged and inside said thrust ring a packing ring 7, e.g. an O ring is arranged, the packing ring inside resting against a shoulder or the like 1" on the nipple 1.

In the shown example the inside edge of the clamping sleeve is also beveled as indicated at 5' for interaction with a corresponding beveled face on the thrust ring 6. If desired, the inside edge of the clamping sleeve can, however, extend radially in which case the thrust ring has no beveled face.

The nut 2 can preferably be shaped with recesses 10 for interaction with a key or with spindle means being inserted into the recesses 10 for tightening or loosening purposes.

In the shown example the coupling is supplemented with the preferred packing means between the nut and the nipple and between the nut and the pipe or hose. An O ring 8 is thus arranged in a recess in the nut on the side facing the end 1' of the nipple 1. Likewise an O ring 9 is inserted into the internal nut boring to seal against the pipe or hose 11. When inserted into the coupling device said pipe or hose end is resting against a step or shoulder 12 in the nipple.

When the nut 2 is tightened towards the nipple 1, the nut bevel face 2 will first be forced against the corresponding beveled face on the clamping sleeve 5 and tighten the clamping sleeve 5 around the pipe or hose. Then the end face of the extension 4 will abut the thrust ring 6 and force it towards the packing ring 7, which in turn is forced towards the shoulder 1". This further tightening of the nut towards the nipple, thus, will establish an effective sealing effect by compression of the packing ring 7. Simultaneously the clamping sleeve 5 is, however, displaced somewhat more inwardly towards the nipple, causing the sharp internal slots on the clamping sleeve 5 firmly to engage the pipe or hose surface.

The described means are so adapted that the nipple end face 1' is forced sealingly towards the O ring 8 in the nut when the nut is tightened towards the nipple so that the coupling is effectively sealed and secured on the pipe or hose.

The described arrangement provides for a more effective pressure transmission to the packing ring 7 than was the case in previously known coupling nipples of this type. Also the threaded joint between the nut and the nipple is very well protected in the present construction. The nut and the nipple, furthermore, can be produced with equal external diametres, which is a considerable advantage in practice. When the coupling is tightened on the end of a pipe or hose, the end edge of the extension 4 will directly abut the thrust ring 6 which in turn directly abuts the packing ring 7. An uncontrolled compressive effect on the ring 7 is thus effectively prevented. In the construction according to the invention the clamping sleeve 5 will engage the surface of the pipe or hose to begin with. Then the extension 4 will abut the ring 6. However, at this time an engagement between the clamping sleeve 5 and the pipe or hose has already been established and further sealing engagement between the internal slots of said sleeve and the pipe or hose surface will then occur simultaneously with compression of the packing ring 7. Thus an extraordinary effective and secure sealing effect is achieved and the coupling nipple according to the invention has proved to be most suitable for high internal pressure as well as for vacuum or external pressure, e.g. when pipes or hoses provided with coupling nipples of this kind are placed under water.

I claim:
1. A fluid tight coupling assembly for the end of a pipe, comprising, a hollow internally threaded nipple, the end of the pipe being positionable within the nipple to form an annular space between the outer surface of the pipe and the internal threads of the nipple, said space being open at one end and being bounded at its other end by a shoulder of the nipple, an annular gasket in said annular space adjacent the shoulder, a clamping sleeve in said annular space surrounding the pipe and axially located on the side of the gasket opposite from the shoulder, said clamping sleeve including gripping means for gripping the pipe when urged in the direction toward the gasket, and an externally threaded nut arranged such that its threads engage and interact with the internal threads of the nipple to secure the nut within the annular space, said nut including an inner end face and a tubular extension having an outer end space, said inner end face located and arranged to exert a force on the clamping sleeve urging it toward the gasket as the nut is threadedly engaged into the annular space, means for causing the gripping means of the clamping sleeve to grip the pipe as the clamping sleeve is being urged toward the gasket, and the outer end face located and arranged to bypass said clamping sleeve to exert a force to compress the gasket as the nut is threadedly engaged into the annular space, wherein when the nut is threadedly engaged through the said opening into the annular space, it acts separately on both the clamping sleeve and the gasket.

2. A fluid type coupling according to claim 1, wherein said means for causing the gripping means of the clamping sleeve to grip the pipe comprises a thrust ring in the annular space between the said outer end of the tubular extension and the gasket, the said outer end acting against the thrust ring which in turn contacts the gasket to compress the latter.

3. A fluid type coupling according to claim 1, said gripping means including teeth on the inside of the clamping sleeve adjacent the surface of the pipe, said clamping sleeve including a beveled surface on the end thereof facing the inner face of the nut, and said inner face being beveled to mate with the beveled surface on the clamping sleeve.

4. A fluid type coupling according to claim 4, including facing surfaces between the nut and nipple and packing means located therebetween.

5. A fluid type coupling according to claim 1, including a packing means located between and forming a fluid tight seal between the nut and the surface of the pipe.

References Cited

UNITED STATES PATENTS

| | | | |
|---|---|---|---|
| 2,481,404 | 9/1949 | Donner | 285—O-ring |
| 2,956,823 | 10/1960 | Benjamin et al. | 285—E |
| 3,186,740 | 6/1965 | Lee | 285—323X |
| 3,222,075 | 12/1965 | Haeber | 285—E |

FOREIGN PATENTS

| | | | |
|---|---|---|---|
| 858,165 | 12/1952 | Germany | 285—343 |
| 534,772 | 3/1941 | Great Britain | 285—356 |

DAVE W. AROLA, Primary Examiner

U.S. Cl. X.R.
285—348, 351, 356